United States Patent
Lutz et al.

(10) Patent No.: US 6,974,005 B2
(45) Date of Patent: Dec. 13, 2005

(54) VIBRATION DAMPER WITH OVERLOAD PROTECTION

(75) Inventors: Dieter Lutz, Schweinfurt (DE); Gottfried Zimmermann, Sulzthal (DE)

(73) Assignee: ZF Sachs AG, Schweinfurt (DE)

( * ) Notice: Subject to any disclaimer, the term of this patent is extended or adjusted under 35 U.S.C. 154(b) by 356 days.

(21) Appl. No.: 10/067,049

(22) Filed: Feb. 4, 2002

(65) Prior Publication Data

US 2002/0104722 A1 Aug. 8, 2002

(30) Foreign Application Priority Data

Feb. 5, 2001 (DE) .................................. 101 05 098

(51) Int. Cl.$^7$ .................................................. F16F 7/12
(52) U.S. Cl. .................. 188/371; 188/315; 188/322.14; 188/376
(58) Field of Search ................................ 188/281, 314, 188/315, 316, 322.14, 322.21, 284, 322.19, 376, 371, 276, 277, 266.8, 322.17, 322.18, 322.16; 267/64.15

(56) References Cited

U.S. PATENT DOCUMENTS

| | | | | |
|---|---|---|---|---|
| 2,732,039 A | * | 1/1956 | Funkhouser et al. ...... | 188/282.6 |
| 3,621,952 A | * | 11/1971 | Long, Jr. ............... | 188/322.17 |
| 3,995,842 A | | 12/1976 | Freitag ..................... | 267/64 R |
| 4,003,454 A | * | 1/1977 | Wossner ................ | 188/322.22 |
| 4,485,899 A | * | 12/1984 | Grundei ...................... | 188/277 |
| 4,718,647 A | * | 1/1988 | Ludwig ................ | 188/322.15 |
| 4,786,037 A | * | 11/1988 | Mills .................... | 188/322.14 |
| 4,915,363 A | * | 4/1990 | Prozeller et al. ......... | 267/64.15 |
| 5,441,132 A | | 8/1995 | Pradel et al. ............... | 188/315 |
| 5,618,248 A | * | 4/1997 | Huang ........................ | 482/112 |
| 5,848,676 A | * | 12/1998 | Deigner ................. | 188/321.11 |

FOREIGN PATENT DOCUMENTS

| | | | | |
|---|---|---|---|---|
| DD | 1 872 232 | 12/1959 | | |
| DD | 39 14 298 | 8/1990 | | |
| DD | 40 36 522 | 10/1991 | | |
| DD | 41 01 567 | 7/1992 | | |
| DE | 4213517 A1 | * 11/1993 | ............ | 188/322.14 |
| DE | 42 16 573 | 11/1993 | | |
| DE | 42 36 150 | 4/1994 | | |
| DE | 44 03 196 | 6/1999 | | |
| DE | 198 23 878 | 12/1999 | | |
| DE | 199 38 084 | 7/2000 | | |

OTHER PUBLICATIONS

Patent Abstracts of Japan, No. 08–247199, Sep. 24, 1996.

* cited by examiner

*Primary Examiner*—Jack Lavinder
*Assistant Examiner*—Mariano Sy
(74) *Attorney, Agent, or Firm*—Cohen, Pontani, Lieberman & Pavane

(57) ABSTRACT

Vibration damper comprising a damping medium-filled pressure tube, in which a displacer is installed, where a damping device produces a damping force as a function of the movement of the displacer. A damping force-limiting device, independently of the flow of the damping medium, becomes active above a certain damping force threshold value, which is defined as a function of the vehicle. At least a partial section of the force-limiting device is connected in a fixed manner to the pressure tube below the damping force threshold value and travels an operating distance which is associated with a change in the volume of the pressure tube when the force threshold is exceeded.

11 Claims, 5 Drawing Sheets

VIBRATION DAMPER WITH OVERLOAD PROTECTION

BACKGROUND OF THE INVENTION

1. Field of the Invention

The invention pertains to a vibration damper of the type having a pressure tube filled with a damping medium, a displacer which is axially moveable in said pressure tube, and a damping device which produces a damping force as a function of the movement of the displacer and the flow of damping medium through the damping device.

2. Description of the Related Art

In a vibration damper, a reactive force is transmitted to the vehicle body as a function of the spring travel of the wheel. The forces which thus occur can reach a considerable level. For this reason, vibration dampers are already designed so that a much weaker damping force is produced in the inward direction of the spring travel of the wheel than in the outward direction. So that all load requirements can be met, the body parts which support the vibration damper must be much stronger than other body assemblies; accordingly, these parts are made, for example, out of sheet or plate which is much thicker than that used for other parts. This increase in the amount of material is unsatisfactory in terms of production engineering and is also associated with a weight disadvantage. If this effort were not made, however, the connection between the vibration damper and the body could break, and in particular in the case of a motor vehicle with shock-absorbing strut units, it would then be impossible to steer the vehicle. Spring travel of this magnitude, however, occurs only in very rare cases, e.g., in an accident, when the vehicle swerves against a high curb or slides through a ditch.

Designs which are intended to handle overloads are also known from the area of gas springs. U.S. Pat. No. 3,995,842 discloses a gas spring in which a predetermined breaking point is provided in the piston rod or in the cylinder. In the case of a vibration damper, however, a predetermined breaking point of this type would allow the oily damping medium to escape from the vibration damper and thus to become a burden to the environment. After the piston rod has broken, furthermore, it may under certain conditions be impossible to steer the vehicle.

DE 42 36 150 describes a gas spring in which a piston ring is deformed out of its groove when a defined load is exceeded, with the result that the two working spaces of the cylinder become connected to each other.

There are many different types of damping valves in vibration dampers which, on the basis of their design, have a degressive damping force characteristic. Thus, in a certain range, only a very moderate increase in the damping force is reached relative to the spring velocity of the wheel. The degressive damping force characteristic is no longer in effect at the spring velocities which occur when extreme obstacles are encountered; in this situation, the flow channels act instead progressively on the damping forces. See, for example, U.S. Pat. No. 5,509,512.

U.S. Pat. No. 5,441,132 discloses a double tube vibration damper, in which a compensation element is installed between the casing tube and the pressure tube to compensate for the temperature-related differences in length attributable to the different materials used for the casing tube and the pressure tube. The spring force of the compensation element acting on the piston rod guide or on the pressure tube is oriented in such a way that the piston rod guide and the casing tube are always braced against each other.

SUMMARY OF THE INVENTION

The task of the present invention is to improve a vibration damper in such a way that only a defined maximum damping force is transmitted to the body of the motor vehicle.

The task is accomplished according to the invention in that, independently of the flow of the damping medium, a damping force-limiting device becomes active when the damping force exceeds a certain threshold, which is defined as a function of the vehicle. At least a partial section of the force-limiting device, which remains connected in a fixed manner to the pressure tube as long as the damping force remains below the threshold, defined as a function of the vehicle, executes a movement along an operating path which is associated with a change in the volume of the pressure tube.

As a result of the defined maximum damping force, it is possible to adapt the connection between the vibration damper and the vehicle body to the actual variables of normal operation much more effectively and thus to decrease exaggerated strength requirements. Simple pressure-relief valves also bring about a progressive increase in the damping force, because ultimately the open cross section of a pressure-relief valve functions as a throttle.

It is thus possible, for example, to provide the pressure tube with at least a one section with elastic properties. A certain elastic expansion represents movement along an operating path, which has the effect of decreasing peak pressures. For this purpose, the thickness of the wall cross sections can be reduced over some or all of the length of the pressure tube. The degree of this reduction can be determined mathematically.

Alternatively or in combination, the pressure tube is surrounded by a casing tube, and a piston rod guide positions the piston rod, which acts as a displacer, in the radial direction. An elastic force, which pretensions the piston rod guide toward the pressure tube, acts between the casing tube and the piston rod guide, and the piston rod guide is able to travel along a displacement path, representing its operating path, in the outward-bound direction of the piston rod as a function of the pressure. The axial travel of the piston rod guide along its displacement path serves to increase the volume of the vibration damper and thus to reduce the force exerted by the pressure in the damper, with the result that lower peak forces are transmitted to the vehicle.

In combination, the vibration damper can also have an equalizing space. Thus, when the piston rod guide travels along its displacement path, a connection between the pressure tube and the equalizing space can be opened, the damping device thus being bypassed. As a result, the pressure in the working spaces is reduced in two different ways.

In view of the fact that the displacement path of the piston rod guide is in the axial direction, the casing tube can be rolled up elastically over the piston rod guide. The rolled area itself acts as a spring.

Alternatively or in combination, a spring is installed between the casing tube and the piston rod guide.

It is also possible for the displacer to be designed as a piston rod in conjunction with a piston, which divides the pressure tube into a working space on the piston rod side and a working space on the side away from the piston rod, and for the damping device to have a vacuum throttle, which reduces the after-flow of damping medium from the equalizing space to the working space which is at the lower pressure level at that moment. A vacuum is generated in a working space, which acts in the direction opposite that of the spring travel of the wheel, so that the resulting force of the spring-loaded movement of the wheel on the vehicle body can be significantly reduced.

To handle especially high loads, a predetermined breaking point is provided in at least one working space, this breaking point opening a bypass for the damping medium leading to a space in the vibration damper at a pressure level lower than that in said working space. Thus, three possible working ranges of the vibration damper are obtained. In a first working range, the damping device provides a damping force curve which makes it possible for the vehicle to be controlled safely in the limit case. If the first damping force threshold value is exceeded, the vibration damper is allowed to undergo defined elastic deformations. If this measure is still not enough, the predetermined breaking point goes into effect when the second damping force threshold is exceeded, in which case the damping medium is retained within the vibration damper.

It is possible, for example, for the working space on the side away from the piston rod to be separated by a bottom valve from the equalizing space and for this bottom valve to have the predetermined breaking point.

Alternatively or in combination, at least one predetermined breaking point leading to the equalizing space can be provided in the pressure tube.

Another possibility is to provide the piston with a predetermined or desired breaking point, which separates the piston from the piston rod.

It has been found to be advantageous for the piston to have a piston ring, which separates the working space on the piston rod side from the working space on the side away from the piston rod and for the piston ring to have a predetermined breaking point.

The piston ring can also be designed so that the piston ring has a predetermined breaking point for each direction of piston movement, each point having a different breaking force.

For this purpose, the connecting means which connect the piston ring to the piston have different retaining forces for each direction of piston movement.

Common to all of the design possibilities indicated above for the predetermined breaking points is that the vibration damper does not leak to the outside and that neither the piston rod nor the pressure tube break away. In addition, a shock-absorbing strut unit would ensure that the vehicle is still completely steerable and that it can be driven slowly to a garage. In terms of the repair work required in any case when a peak load such as that considered here occurs, it is much cheaper to replace a vibration damper than to repair a deformed fender arbor or other suspension component.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
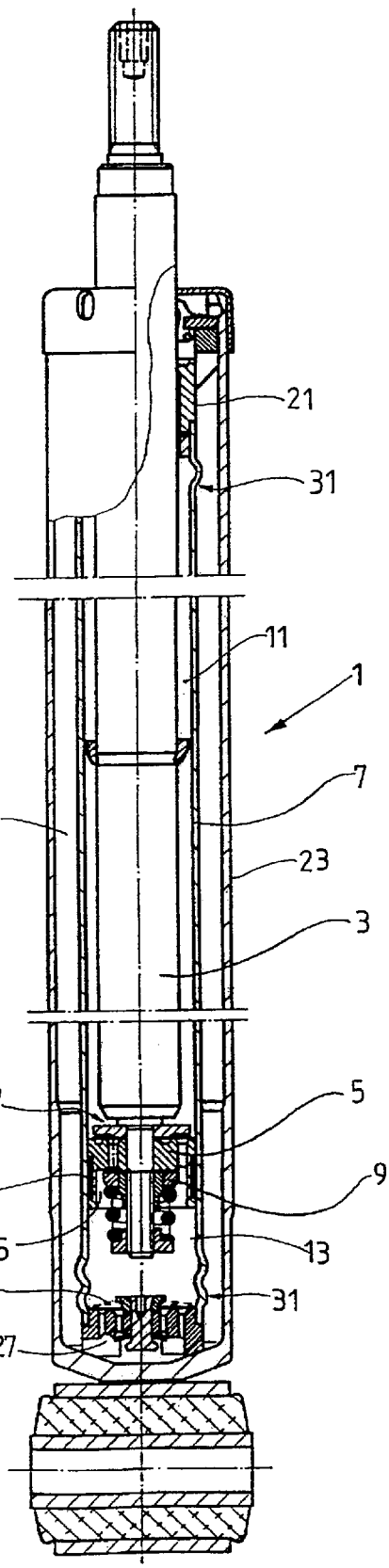
FIG. 1 shows an overall view of a vibration damper.

FIG. 1 shows a vibration damper 1 as known in principle in accordance with the state of the art. The damper has a piston rod 3 with a piston 5, which is mounted as a single structural unit with freedom of axial movement inside a damping medium-filled pressure tube 7. The piston 5 is held axially in place by a fastening means in the form of a piston nut 9. The piston 5 separates the pressure tube 7 into a working space 11 on the piston rod side and a working space 13 on the side away from the piston rod. A damping valve 15 is provided in the piston, at least for the outbound direction of the piston rod. For the inbound direction, there is at least one nonreturn valve 17 in the piston, and a piston ring 19 ensures that no leakage can occur between the two working spaces 11, 13. A piston rod guide 21 seals off the working space 11 on the piston rod side. A casing tube 23 surrounds the pressure tube 7 and works with it to form an equalizing space 25. A bottom valve 27 is provided between the working space 13 on the side away from the piston rod and the equalizing space 25, which valve produces a damping force when the piston rod 3 travels inward. A nonreturn valve 29 makes it possible for damping medium to flow back from the equalizing space 25 into the working space 13 on the side away from the piston rod when the piston rod 3 is moving outward.

Various design measures can be taken on the vibration damper to allow a damping force-limiting function to go into effect as a function of damping force threshold values independently of the flow of damping medium.

Figure 2:
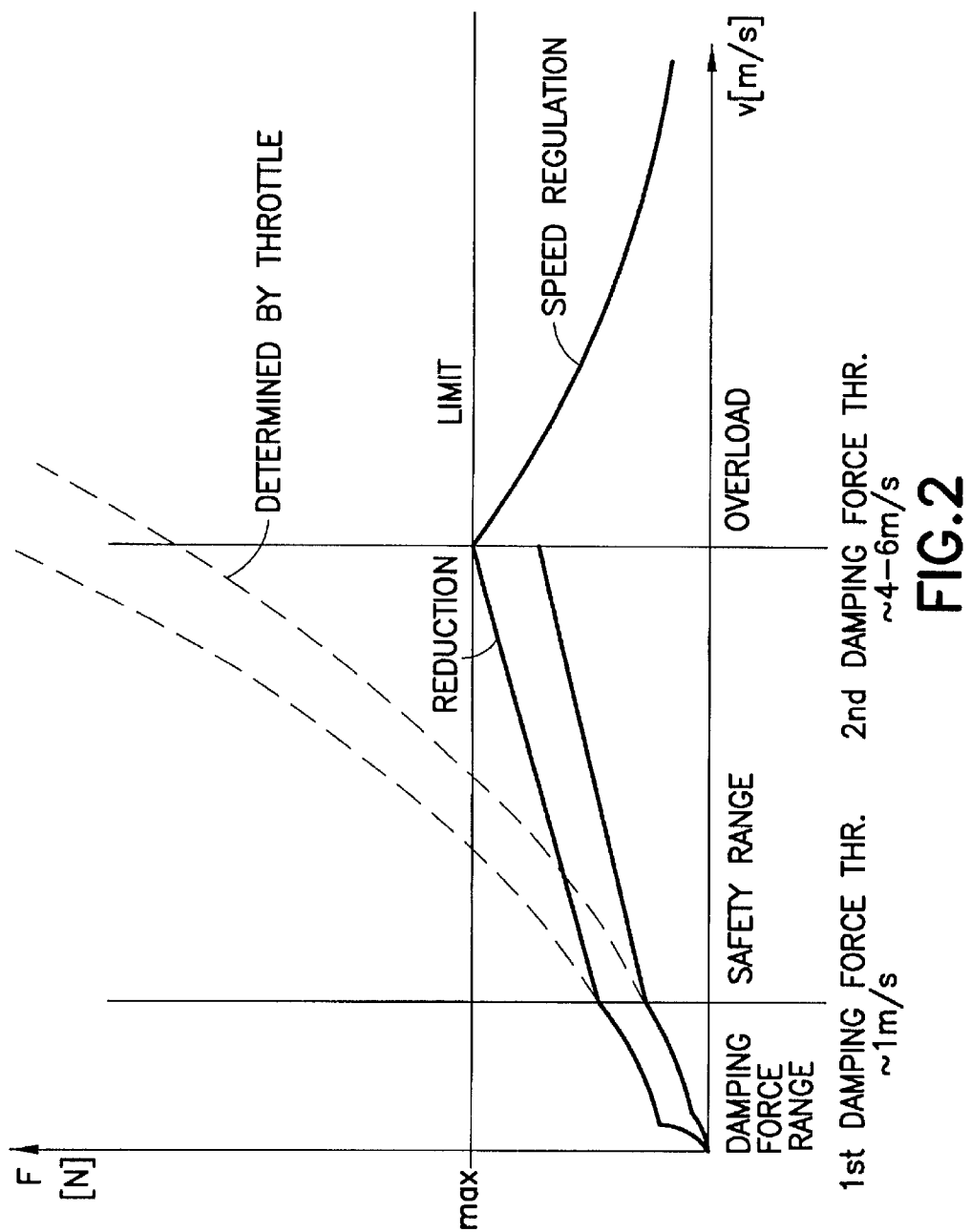
FIG. 2 shows a complete damping force characteristic curve of a vibration damper.

FIG. 2 shows a characteristic damping force curve which follows this functional principle. In a first damping force range up to a first damping force threshold value, which is designed, for example, for a wheel spring velocity of up to 1 m/s, only the damping forces generated by the damping valves in the piston and in the bottom valve are active. The goal here is to arrive at a degressive characteristic. In this damping force range, the vibration damper is working as originally intended.

Following this first damping force range is a safety range, in which, by the use of suitable means in the vibration damper, the damping force is kept as constant as possible or allowed to increase only slightly up to a second damping force threshold. The safety range is used, for example, when the vehicle is driven over an obstacle at very high speed. A conceivable application would be an avoidance maneuver in which the vehicle is driven over a curb. When use is made of this safety range, the vibration damper is not in a defective state afterwards. The dotted line is intended to show the course of the damping force of the damping valves 15; 27, which would occur without the action of the damping force-limiting function.

Above a second damping force threshold, an overload range follows the safety range; this overload range may not ever be reached during the entire life-span of the vehicle. Damping forces of this type can occur, for example, when the vehicle leaves the road and slides through a field. So that the vehicle remains steerable at least on the basis of its chassis components, a predetermined breaking point inside the vibration damper opens, as a result of which a bypass for the damping medium from a working space with a high pressure level to a space with a much lower pressure level is released. Thus the damping force decreases, possibly even to zero.

In FIG. 1, an elastic section 31 in the pressure tube 7 is provided as a possibility of realizing the safety range in the two working spaces 11; 13. Under high loads, the high pressure prevailing in the working spaces 11; 13 can be limited by an increase in the size of the pressure tube 7, at least up to the point at which a second damping force threshold is reached. The elastic sections 31 are situated outside the normal working range of the piston 5. It would also be possible to use a pressure tube 7 with an area of reduced wall thickness, which would inflate elastically under very high pressures or which, to speak metaphorically, would be able to "breathe".

Figure 3A:
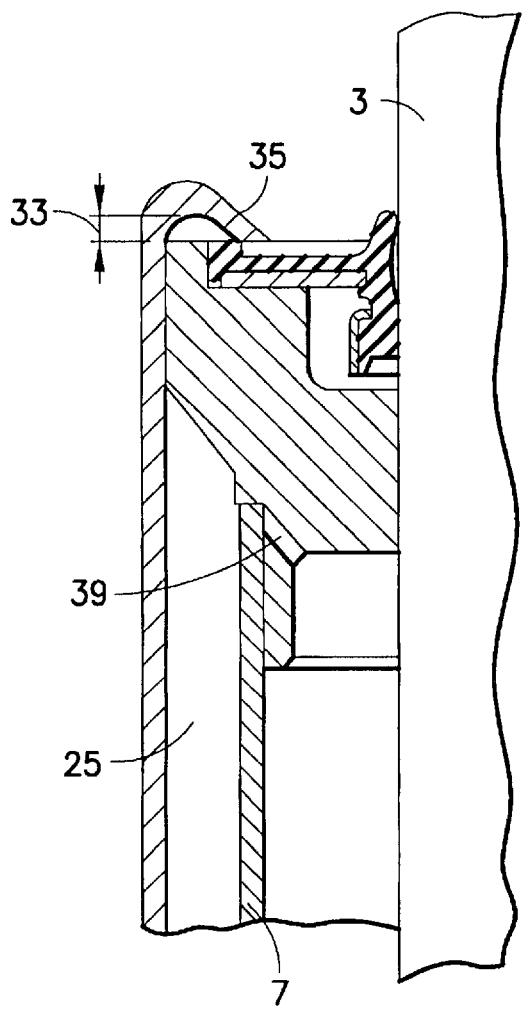
FIGS. 3A and 3B show the part of a vibration damper in the area of the piston rod guide.
Figure 3B:
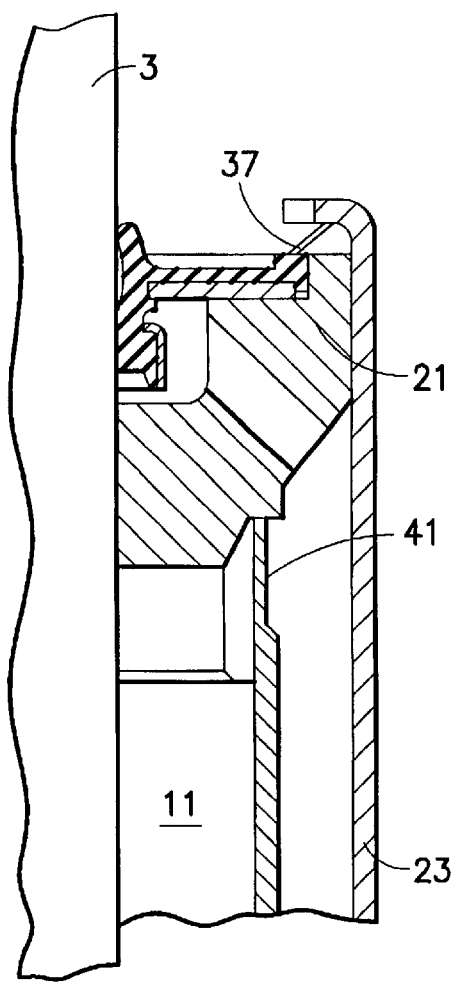

Several ways in which the safety range according to FIG. 2 can be realized in a vibration damper are shown in FIGS. 3A and 3B. The connection between the casing tube 23 and the piston rod guide 21 is designed with a spring force acting in the direction of the piston rod guide. This spring force is calculated so that, under normal load conditions, the piston rod guide 21 rests firmly against the pressure tube 23. In the safety range, the piston rod guide, acting as a damping force-limiting device, can travel an operating distance along an axial displacement path 33 of the piston rod guide 21, and the associated increase in the size of the working space on the piston rod side limits the further increase in pressure. The spring force can be achieved by means of a rolled area 35, where the edge of the casing tube corresponds to a disk spring. As an alternative, a disk spring 37, for example, or some other type of elastic element can be installed between the flanged edge of the casing tube and the top surface of the piston rod guide 21.

The displacement path 33 can be used to open a bypass between the working space 11 on the piston rod side and the equalizing space 25. For this purpose, a bypass channel 39, which is closed by the pressure tube 7 during normal operation, is provided in the piston rod guide.

For overload operation, a predetermined breaking point 41 is realized in the pressure tube 7 as a localized area of decreased wall thickness. Under excessive pressure, the pressure tube breaks, and the working space 11 on the piston rod side becomes connected to the equalizing space 25. The size of the cross section of the predetermined breaking point is selected to guarantee that no damping effect will occur and that the piston rod 3 with the piston 5 will pump the damping medium in the pressure tube 7 around between the working spaces 11; 13 and the equalizing space 25 with practically no resistance.

Figure 4A:
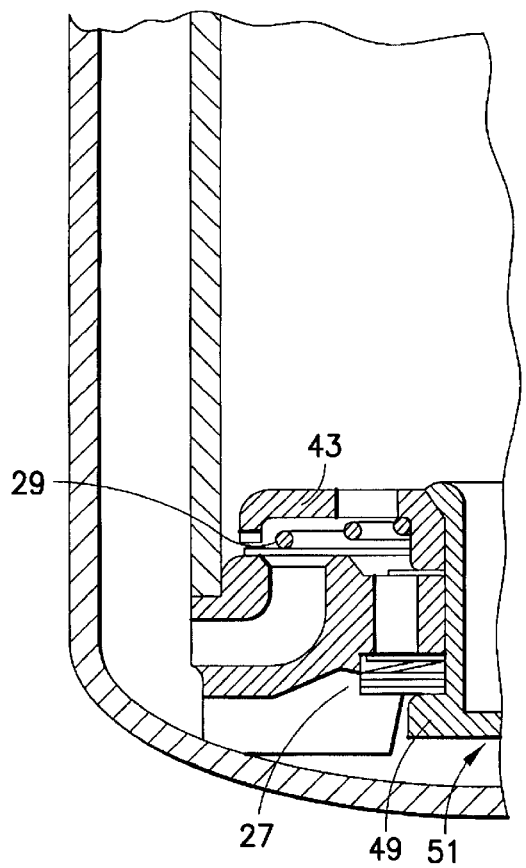
FIGS. 4A and 4B show the area of the vibration damper where the bottom valve is located.
Figure 4B:
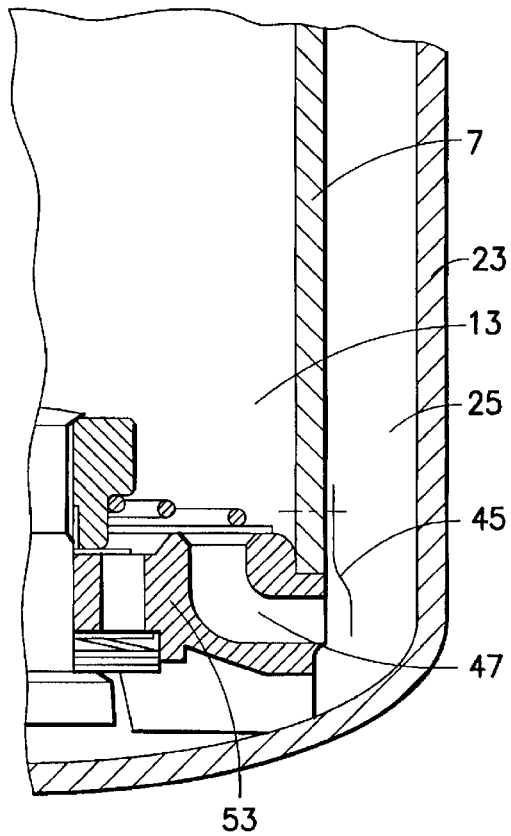

FIGS. 4A and 4B show only the bottom end of the vibration damper 1. Several measures for limiting the damping force and for providing overload protection are again taken in the bottom valve 27. Thus, in the case of the nonreturn valve 29 between the working space 13 on the side away from the piston rod 3 and the equalizing space 25, the lifting stroke of the nonreturn valve is limited by a stop 43. See FIG. 4A. This limitation has no effect on the vibration damper during normal operation. But when the piston rod travels outward at high speed, the size of the working space on the side away from the piston rod increases, and damping medium flows out of the equalizing space 25 into the working space 13 on the side away from the piston rod as a result of the pressure gradient. If a wheel spring velocity in the safety range of the damping force characteristic is reached, the limitation on the lifting stroke has the effect of preventing damping medium from flowing on the equalizing space 25 at the rate which would be necessary to equalize the pressure in the working space 13 on the side away from the piston rod. What happens is that damping medium and gas mix together in the equalizing space 25, as a result of which a negative pressure develops in the working space 13 on the side away from the piston rod; this negative pressure opposes the movement of the piston rod, and as a further consequence the resulting force acting on the vehicle body is reduced. As an alternative, a cover element 45 FIG. B can act on the channel 47 of the nonreturn valve 29 to reduce its cross section.

Two independent measures for the overload range of the damping force characteristic are shown. A central fastening means 49 in the bottom valve has a thin floor 51, which breaks away when the pressure is too high in the working space 13 on the side away from the piston rod and thus forms a predetermined breaking point. Depending on the diameter of the bottom valve, webs 53 between the flow channels can also break and very quickly open a very large cross section leading to the equalizing space 25.

Figure 5:
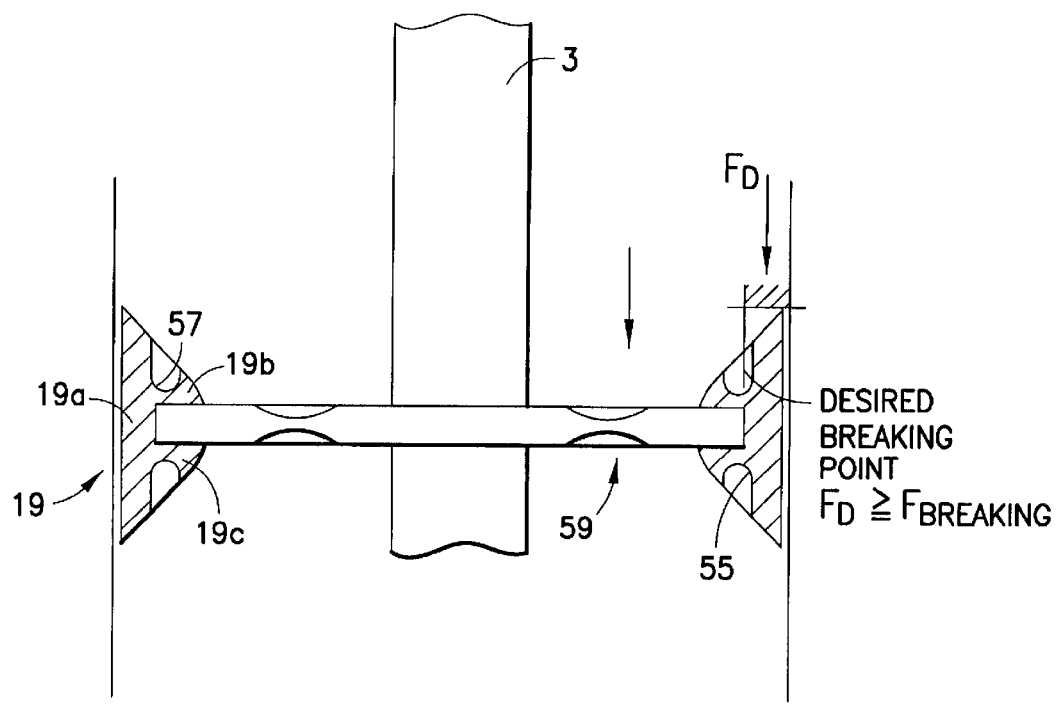
FIG. 5 shows a piston ring with a predetermined breaking point.

FIG. 5 shows the piston 5 in simplified form. The piston ring 19 also has a predetermined breaking point 55 for an overload situation in the inward-bound direction and a separate predetermined breaking point 57 for an overload in the outward-bound direction of the piston. For this purpose, for example, different cross sections can be used at the transitions between a jacket-like sealing surface 19a and connecting means in the form of retaining surfaces 19b; 19c of the piston ring 19 on the piston 5. In addition, predetermined breaking points such as cross-sectional reductions 59 in the piston, which destroy the piston in response to an overload, can also be used. Another type of predetermined breaking point can consist in that the fastening means, e.g., a snap ring, is dislodged, so that the entire piston comes loose from the piston rod.

The means described above for limiting the damping force and for realizing a safety range and an overload range can be used both for single-tube and for twin-tube vibration dampers. In many cases, single-tube vibration dampers are already being provided with a bottom valve so that the gas pressure in the equalizing space can be reduced. When the bottom valve breaks, only a limited damping force can develop, namely, a force which is necessarily proportional to the pressure existing at that instant in the equalizing space.

It is also possible to omit the overload range if it the safety range of the damping force characteristic can be set up in such a way that a wheel spring velocity sufficient to overload the strength of the vibration damper connection will never occur. On the other hand, thought can be given to elimination of the safety range when, for example, vibration dampers have become so inexpensive as a components that there is no longer any economically justifiable reason for taking elaborate measures in terms of construction work to deal with events which may never occur.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A vibration damper for a vehicle, said vibration damper comprising
   a pressure tube having a volume filled with a damping medium,
   a casing tube radially surrounding said pressure tube,
   a piston rod guide in said casing tube,
   a displacer which is axially moveable in said pressure tube cause said damping medium to flow, said displacer comprising a piston rod positioned in said piston rod guide, said piston rod being moveable in an outward direction from said pressure tube,
   a damping device which produces a damping force as a function of the movement of the displacer and flow of said damping medium through said damping device, and
   a damping force limiting device which limits said damping force, independently of the flow of damping medium, when said damping force exceeds a damping force threshold defined as a function of the vehicle, said force limiting device comprising means for exerting an elastic force which pretensions said piston rod guide toward said pressure tube, said piston rod guide being movable relative to said casing tube in said outward direction along an operating path against said elastic force when said damping force exceeds said damping force threshold.

2. A vibration damper as in claim 1 further comprising
   an equalizing space between said casing tube and said pressure tube, and
   a bypass channel connecting said pressure tube to said equalizing space, said bypass channel opening when said piston rod guide moves along said operating path.

3. A vibration damper as in claim 1 wherein said casing tube comprises a rolled area which bears elastically against said piston rod guide, said means for exerting an elastic force comprising said rolled area.

4. A vibration damper as in claim 1 wherein said means for exerting an elastic force comprises a spring located between said casing tube and said piston rod guide.

5. A vibration damper for a vehicle, said vibration damper comprising
   a pressure tube filled with a damping medium,
   a piston rod which is axially moveable in said pressure tube to cause said damping medium to flow,
   a piston fixed to an end of said piston rod, said piston dividing said pressure tube into a working space toward said piston rod and a working space away from said piston rod,
   an equalizing space to which damping medium flows from said working space away from said piston rod as said piston rod moves inward, and from which said damping medium flows to said working space away from said piston rod as said piston rod moves outward,
   a damping device which produces a damping force as a function of the movement of the piston and flow of said damping medium through said damping device, said damping device comprising a vacuum throttle which reduces flow from the equalizing space to the working space away from the piston rod as said piston rod moves outward, thereby developing a negative pressure in the working space away from the piston rod.

6. A vibration damper for a vehicle, said vibration damper comprising
   a pressure tube having a volume filled with a damping medium, said volume comprising at least one working space,
   a casing tube radially surrounding said pressure tube and forming an equalizing space between said pressure tube and said casing tube,
   a displacer which is axially moveable in said pressure tube to cause said damping medium to flow,
   a damping device which produces a damping force as a function of the movement of the displacer and flow of said damping medium through said damping device, and
   a predetermined breaking point which breaks to open a bypass connecting said at least one working space to said equalizing space when said damping medium exceeds a predetermined pressure in said working space.

7. A vibration damper as in claim 6 wherein said displacer comprises a piston rod having an end with a piston fixed thereto, said piston dividing said volume into a working space toward said piston rod and a working space away from said piston rod, said vibration damper further comprising
   a bottom valve separating said working space away from said piston rod and said equalizing space, said bottom valve comprising said predetermined breaking point.

8. A vibration damper as in claim 6 said pressure tube comprises said predetermined breaking point.

9. A vibration damper for a vehicle, said vibration damper comprising:
   a pressure tube having a volume filled with a damping medium, said volume comprising at least one working space,
   a displacer which is axially moveable in said pressure tube to cause said damping medium to flow, wherein said displacer comprises a piston rod having an end with a piston fixed thereto, said piston dividing said volume into a working space toward said piston rod and a working space away from said piston rod, said piston carrying a piston ring which comprises a predetermined breaking point which breaks to open a bypass connection connecting said working spaces when said damping medium exceeds a predetermined pressure in one of said working spaces, and
   a damping device which produces a damping force as function of the movement of the displacer and flow of said damping medium through said damping device.

10. A vibration damper as in claim 9 wherein said piston ring has a predetermined breaking point for each direction of motion of the piston, each said breaking point having a different breaking force.

11. A vibration damper as in claim 10 further comprising retaining means for retaining the piston ring to the piston, said retaining means exhibiting retaining forces which are different for each direction of motion of the piston.

* * * * *